UNITED STATES PATENT OFFICE.

JACOBUS JAN WILLEM HENDRIK VAN DER TOORN, OF THE HAGUE, NETHERLANDS.

PROCESS FOR THE EXTRACTION OF GOLD FROM CLAY.

1,033,359.   Specification of Letters Patent.   Patented July 23, 1912.

No Drawing.   Application filed February 5, 1910. Serial No. 542,363.

*To all whom it may concern:*

Be it known that I, JACOBUS JAN WILLEM HENDRIK VAN DER TOORN, a subject of the Queen of the Netherlands, residing at The Hague, Netherlands, have invented certain new and useful Improvements in Processes for the Extraction of Gold from Clay, of which the following is a full, clear, and exact description.

As is well known, gold is found in the gold fields of some countries in the clayey layers of the earth in a finely divided state or in small grains and from which clay it is very difficult to separate it. For instance the clay layers in Surinam (Dutch Guiana) which are deposited on the so called bedrock, contain a large quantity of fine gold which is very difficult to separate therefrom, and under the present known systems a large percentage is lost during the process of extraction.

All the present methods in which the excavated clay is treated with water in order to extract the gold therefrom, have disadvantages in that a considerable percentage of the gold is lost with the mud. This disadvantage arises from the fact that a separation of gold from clay is extremely difficult on account of the sticky nature of the clay. As soon as the mixture of gold and clay is freed from this peculiarity, the difficulty to separate both substances is eliminated, and the gold can be extracted just as easily from clay as from earth and other auriferous ores and sand.

Such a method is the object of this present invention, of which the following is a description:—

The clay obtained by means of a drag or in any other way is deposited in a suitable place, where it may be kneaded should it require it in order to produce a firmly coherent mass. This mass is then allowed to drain and is heated in kilns such as are used in the making of bricks, or in any other manner until the mass is as hard as stone. These stone-like lumps which contain whatever gold may be present in the clay, are broken up in ordinary mills, and after this treatment the separation of the gold from the clay can be effected just as easily as from any other auriferous ore.

I am aware that attempts have been made to roast clay in order to render the gold therein more amenable to treatment; but such attempts have not been successful owing to the fact that the sticky matter with which clay is normally impregnated, and which in fact is largely responsible for the peculiar properties of clay, resists the action of heat until a temperature materially in excess of that heretofore employed in such roasting operation has been attained. When however the clay is subjected to an intense heat for a sufficient length of time, this sticky matter disintegrates, the substance loses its clay like properties and is no longer capable of taking up water to form a pasty mass. In other words, it ceases to be clay and is converted into a stone-like material. The treatment therefore involves the application of heat in such a manner as to change the very nature of the material; the heating action being so intense that the clay in many cases begins to break up. When it is feared that the clay may break up too much as a result of the heating it may be subjected to the same treatment which is adopted in the ordinary kilns. In some instances the heating of the clay may take place just after it is excavated.

The main principle of this process is that the excavated clay is heated either after previous drying in the air, or immediately after being excavated instead of being dissolved in water as was the practice up till now. If the position of the clay layer should permit it, the heating in certain cases may be done on the spot. In cases where the auriferous clay is adhering to smaller stones or pieces of bedrock, the gold may be separated from this clay by dissolving the clay in water, for which purpose it is only necessary to wash the rocks with water. Subsequently the mixture is allowed to settle down and the clay deposited is treated and heated in the same manner as above described. Substantially none of the gold is lost in this process.

What I claim as my invention and desire to secure by Letters Patent is—

1. The process of winning finely divided gold from gold bearing clay which comprises, subjecting the clay to be treated to an intense heat, thereby disintegrating the sticky matter with which such clay is normally impregnated, and converting the residue to a porous stone-like material which will not deleteriously react with the solvent subsequently used, disrupting said material, introducing a gold dissolving solution into the pores of the disrupted material and thereby dissolving substantially all of the gold therefrom.

2. The process of winning finely divided gold from gold bearing clay which comprises subjecting the clay to be treated to heat sufficiently intense to disintegrate the sticky matter with which such clay is normally impregnated and to convert the residue to a porous substance of stone-like hardness the gold within the pores of which is accessible to a solvent for said gold with which said substance may be treated, and thereafter extracting said gold by means of such solvent.

In witness whereof, I subscribe my signature, in the presence of two witnesses.

JACOBUS JAN WILLEM HENDRIK van der TOORN.

Witnesses:
   Af. A. Cromer,
   J. K. van Munchenbroek.

Copies of this patent may be obtained for five cents each, by addressing the "Commissioner of Patents, Washington, D. C."